(12) United States Patent
Cole

(10) Patent No.: US 11,499,896 B2
(45) Date of Patent: Nov. 15, 2022

(54) SAMPLING APPARATUS WITH A SORBENT IN A RECESS

(71) Applicant: Markes International Limited, Rhondda Cynon Taff (GB)

(72) Inventor: Martyn Rhys Cole, Rhondda Cynon Taff (GB)

(73) Assignee: Markes International Limited, Rhondda Cynon Taff (GB)

( * ) Notice: Subject to any disclaimer, the term of this patent is extended or adjusted under 35 U.S.C. 154(b) by 117 days.

(21) Appl. No.: 16/099,856

(22) PCT Filed: May 9, 2017

(86) PCT No.: PCT/GB2017/051284
§ 371 (c)(1),
(2) Date: Nov. 8, 2018

(87) PCT Pub. No.: WO2017/194926
PCT Pub. Date: Nov. 16, 2017

(65) Prior Publication Data
US 2019/0113424 A1 Apr. 18, 2019

(30) Foreign Application Priority Data
May 9, 2016 (GB) ...................................... 1608089

(51) Int. Cl.
*G01N 1/40* (2006.01)
(52) U.S. Cl.
CPC .................................... *G01N 1/405* (2013.01)
(58) Field of Classification Search
CPC ................................. G01N 1/40; G01N 1/405
See application file for complete search history.

(56) References Cited

U.S. PATENT DOCUMENTS 10,060,887 B2 * 8/2018 Lawrence ............ G01N 30/482
10,545,073 B2 * 1/2020 Pawliszyn ................ G01N 1/36
(Continued)

FOREIGN PATENT DOCUMENTS

DE 10207499 A1 9/2003
EP 0725279 A1 8/1996
(Continued)

OTHER PUBLICATIONS

"Solid phase Microextraction Arrow for the sampling of volatile amines in wastewater and atmosphere" by Helin et al. ("Helin") as published in Journal of Chromatography A, 1426 (2015) 56-63.*
(Continued)

*Primary Examiner* — Justin N Olamit
(74) *Attorney, Agent, or Firm* — Elmore Patent Law Group, P.C.; Joseph Zucchero; Carolyn Elmore

(57) ABSTRACT

A sample probe for sorptive sampling comprises an elongate body having a longitudinal axis defined along its length and a radial axis extending transverse to the longitudinal axis. A sorbent element formed of a sorbent material is secured to the body. The elongate body has an outer surface and a recess located along the length of the body that extends radially into the outer surface. The sorbent element is at least partially received within the recess of the body which mechanically locks the sorbent element to the body to prevent relative longitudinal movement of the sorbent element relative to the body.

12 Claims, 2 Drawing Sheets

(56) References Cited

U.S. PATENT DOCUMENTS

| | | | |
|---|---|---|---|
| 2003/0021733 | A1 | 1/2003 | Andresen et al. |
| 2003/0233893 | A1 | 12/2003 | Bremer |
| 2007/0209453 | A1 | 9/2007 | Akinbo et al. |
| 2010/0313688 | A1 | 12/2010 | Hiltbrand |
| 2012/0055269 | A1 | 3/2012 | Londo et al. |
| 2014/0220701 | A1* | 8/2014 | Schueler .............. G01N 1/08 436/178 |
| 2014/0377132 | A1 | 12/2014 | Shimase et al. |
| 2015/0276780 | A1 | 10/2015 | Bremer et al. |

FOREIGN PATENT DOCUMENTS

| | | |
|---|---|---|
| EP | 2025418 A1 | 2/2009 |
| GB | 2407868 B | 5/2005 |
| JP | S62242858 A | 10/1987 |
| WO | 2005043129 A2 | 5/2005 |
| WO | 2015065183 A1 | 5/2015 |

OTHER PUBLICATIONS

"PAL SPME Arrow—evaluation of a novel solid-phase microextraction device for freely dissolved PAHs in water" by Kremser et al. ("Kremser") as published in ANAL Bioannal Chem (2016) 408: 943-952.*

* cited by examiner

SAMPLING APPARATUS WITH A SORBENT IN A RECESS

The present invention relates to a sampling probe, and in particular a sampling probe comprising a sorbent substrate for sorbent sampling of liquids and gases.

Sampling techniques are frequently utilised to identify components within a liquid, such as pollutants in drinking water, fragrance allergens in cosmetics or flavour profiling of beverages. The analysis of such samples may involve liquid-liquid extraction (LLE) or solid phase extraction (SPE).

Solid phase extraction may be achieved using Polydimethylsiloxane (PDMS). PDMS extraction is based on adsorption, an equilibrium technique based on the partitioning of analytes between the silicone and the aqueous phases. A sorptive material is placed into a liquid sample, and the sorptive material absorbs the compound of interest contained therein. The quantity of analyte extracted is proportional to its concentration in the sample, providing equilibrium is reached. The amount of analyte extracted is also dependant on the size and hence maximum absorption volume of the analyte material. The extraction into the PDMS can be estimated based on the octanol-water partition coefficient of the analyte (K O/W). The ratio of the PDMS to the sample, known as the phase ratio, becomes an important factor in analyte recovery. The extraction efficiency depends on the mass of solid phase.

PDMS may be used in Solid Phase MicroExtraction (SPME), a known solid phase extraction sampling technique for extracting organic compounds from sample. SPME involves the use of a fibre coated with thin layer of sorptive material, such as PDMS, that forms the extracting phase. The sorptive material may be a solid sorbent selected to extract varying types of analytes from a range of sample media, including both liquid and gas phase. SPME has found widespread use as it is easily automated.

The size of the fibre, coated with the sorbent enables it to be housed within the body of a needle used to pierce the sample vial. Once the needle has been inserted into the vial the fibre is extended out of the needle and introduced into the sample matrix. The needle is then removed and the sample held on the fibre is subsequently desorbed for analysis in a Gas Chromatograph.

However, the necessity to fit within a needle, limits SPME to a very thin layer of PDMS (~7-100 Cm). Accordingly, the total volume of the recovered compounds is limited, typically in the order of 0.5 CL with K O/W values below 1000 (log K O/W 3). The disadvantage with SPME is therefore a limitation in the amount of adsorbent that can be loaded onto a fibre.

To address the low capacity limitations of SPME sampling, higher capacity sorptive extraction samplers have been developed. Such high capacity samplers include metal probes having a sleeve of PDMS material provide around the probe which is significantly larger than is used in SPME. The larger dimension of the sleeve, and its exposed location on the outer surface of the probe has made such probes susceptible to wear and damage. In use the probes are commonly inserted into a sample vessel having a septa seal, and the probe is required to puncture the septa and/or insert through the septa in a tight fitting manner. The frictional engagement between the sample probe and the septa seal can lead to damage of the sorbent material and removal of the material from the surface. As well as requiring constant replacement or maintenance of the probes, this may also lead to the sample process being compromised.

It is therefore desirable to provide an improved sampling probe for sorbent sampling which addresses the above described problems and/or which offers improvements generally.

According to the present invention there is provided a sampling apparatus and method of sampling as described in the accompanying claims.

In an embodiment of the invention there is provided a sample probe for sorptive sampling comprising an elongate body having a longitudinal axis defined along its length and a radial axis extending transverse to the longitudinal axis. A sorbent element formed of a sorbent material is secured to the body. The elongate body has an outer surface and a recess located along the length of the body that extends radially into the outer surface. The sorbent element is at least partially received within the recess of the body. Locating at least part of the sorbent element within the radial recess mechanically locks the sorbent element to the body to prevent relative longitudinal movement of the sorbent element relative to the body. This advantageously obviates the requirement to rely exclusively on chemical bonding to secure the sorbent element to the body, which has been found to be difficult to achieve, and ensures that the sorbent element is not able to be dragged off the body by a septa or otherwise in use. The term 'sorbent' refers to any substance which has the property of collecting molecules of another substance by sorption. The term sorption covers both absorption and adsorption.

Preferably the sorbent element is received within the recess such that the sorbent material does not extend radially outwards of the recess. This ensures that the sorbent element is flush with or recessed beneath the outer surface, which prevents a sealing element from contacting the sorbent material during insertion and/or retraction of the probe from a sample vessel.

The body of the sampling probe may include a shaft and first and second parts of greater diameter than the shaft located at either end thereof. The sorbent element is a sleeve that is received around the shaft. The term 'sleeve' refers generally to a layer of sorbent material that surrounds the shaft. The sleeve may be an independent component that is able to be inserted onto the shaft. Alternatively the sleeve may be a layer of material that is deposited onto or otherwise formed onto and/or bonded to the shaft.

The enlarged diameter sections have opposing inner ends which face towards the shaft in the longitudinal direction. Each inner face includes a longitudinally extending recess arranged to receive an end of the sorbent sleeve such that the sleeve is both radially and longitudinally constrained by the enlarged diameter sections. The stepped diameter between the shaft and the enlarged diameter sections defines the recess in which the sorbent element is received.

The recess of each enlarged diameter section includes an inner wall and an outer wall in the radial direction and the ends of the sleeve is located between the inner and outer walls of each recess, thereby radially constraining the sleeve at both ends.

Preferably the sleeve is longitudinally clamped between the first and second enlarged diameter sections.

The sleeve preferably has an outer diameter equal to or less than the diameter of the enlarged diameter sections. In this way the outer surface of the sleeve is located flush with or is recessed radially inwards of the outer surface of the enlarged diameter sections which thereby shield the sleeve. The recesses of the enlarged diameter sections are preferably annular such that they receive the ends off the sleeve around their entire circumference.

Each longitudinally extending recess of the enlarged diameter sections tapers radially inwards in the longitudinal direction away from the inner face of the enlarged diameter sections. The tapering of the recess provides radial constriction of the end parts of the sleeve between the radial inner and outer walls of the recess to clamp the end parts and create a seal between the enlarged diameter sections and the sleeve. The sealing of the sleeve at either end advantageously prevents liquid ingress into the sleeve between the sleeve and the shaft, which can cause carry over of sample to the next sample and thereby impacts results.

Preferably the inner wall of the recess has a diameter that is continuous with the diameter of the shaft such that the shaft is able to be received within the bore of the sleeve. The outer wall tapers radially inwards towards the inner wall in the longitudinal direction to the base of the recess.

Preferably at least one of the enlarged diameter end sections is releasably connected to the shaft.

Preferably one of the enlarged diameter end sections is secured to the shaft by a threaded connection. The end section includes a threaded bore and the end of the shaft includes a threaded connector section having a cooperating thread at its radially outer surface. The threaded connection allows the shaft to be disconnected from one of the enlarged diameter end sections. This enables the sleeve to be inserted onto the shaft before the shaft is reconnected to the enlarged diameter end section.

The length of the sleeve is selected such that it corresponds to the length of the shaft and both recesses of the end sections, the shaft length not including the length of the threaded connector section. As the shaft is threaded back into the end section the sleeve is longitudinally received within the recesses. The end sections move towards each other as threaded connection continues and the ends of the sleeves are clamped between the two end sections in the longitudinal direction, and between the inner and outer walls of the recesses in the radial direction.

The first enlarged diameter end section preferably includes a tapered tip at its outer, distal end to assist insertion of the probe into a sample vessel. The first enlarged diameter end section and the shaft are preferably integrally formed as a unitary component.

The second enlarged diameter end section includes a connection portion at its distal end, being the opposite end to the inner face, the connection portion being configured to allow the probe to be connected to by an actuator such as a robotic arm or for manual use.

In another embodiment of the invention the elongate body preferably comprises at least one channel formed in the surface thereof, the channel defining said recess. The sorbent material is provided within the channel such that an outer surface of the sorbent material is exposed. The sorbent material may be moulded, adhered or secured into the channel by any suitable means.

The body of the sample probe has an outer surface and the sorbent material is preferably recessed within the body such that the exposed outer surface of the sorbent material does not extend radially outwards of the outer surface of the body. Keeping the sorbent material flush with or recessed beneath the outer surface of the probe prevents significant contact with the sorbent material.

The body may include at least two longitudinally extending channels arranged on diametrically opposed sides of the body, each channel containing sorbent material.

The channels are preferably longitudinally extending and longitudinally aligned.

The body of the probe may include a tip section and a stem section which are detachably connected and the sorbent material is provided on the tip section. This enables the sorbent material to be periodically replaced through replacement of the tip section without the requirement to replace the entire probe.

The distal end of the tip section may have a first diameter and the proximal end has a second diameter that is preferably greater than the first diameter. A tapered section interconnects the first and second diameter sections, the sorbent material being located on the first diameter section. The majority of the force in piercing and sealing against the septum is therefore borne by the wider diameter section, limiting the shear forces on the tip section.

The shaft may include a further recess arranged to receive a marker element carrying a barcode or other indicia. The recess comprises a region of reduced diameter that ensures the indicia, which is preferably an adhesive strip secured around the circumference of the shaft, does not extend past the outer surface of the shaft preventing the strip from being damages or removed in use.

The present invention will now be described by way of example only with reference to the following illustrative figures in which.

Figure 1:
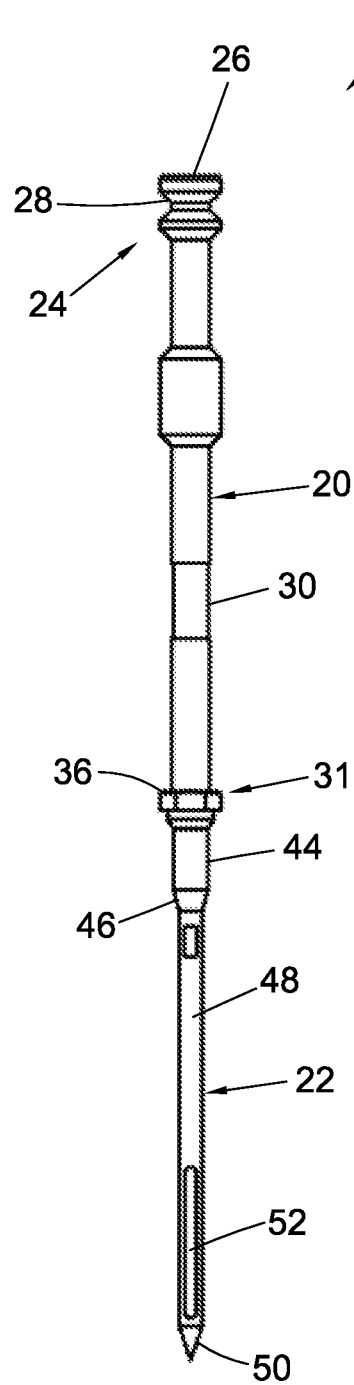
FIG. 1 shows a sampling probe according to an embodiment of the invention.

Referring to FIG. 1, the sampling probe 10 includes a stem having an upper stem section 20 and a lower stem section 22. The upper stem section 20 is cylindrical and includes at its upper end 24 a connector portion 26 having a greater diameter than the main shaft of the upper stem section 20. The connector portion 26 includes a circumferentially extending bevelled engagement channel 28 of reduced diameter that is configured to receive a corresponding latching element of a z axis actuator of a robotic arm. The latching element may be a spring loaded ball catch or any other suitable element that is configured to extend into and engage with the channel 28 to vertically retain the probe 10.

The upper stem section 20 includes a locking section 31. The locking section 31 includes a radially extending shoulder section 36 having a diameter greater than the main body of the upper stem section 20. The shoulder 36 is arranged to receive a latch plate or similar locking element. In use a latch plate is arranged such that when the probe 10 is received at a location where it is required to vertically lock the probe 10 in position, the latch plate is vertically aligned such that the lower surface of the latch plate is vertically aligned with the upper surface of the shoulder 36.

The probe 10 may be received through an aperture in the latch plate. The latch plate is horizontally slidable to a locked position in which at least part of the plate is located above the shoulder 36. When the latch plate is in a locked position the removal of the probe 10 in the vertical direction is prevented by engagement of the shoulder 36 with the latch plate.

Figure 2:
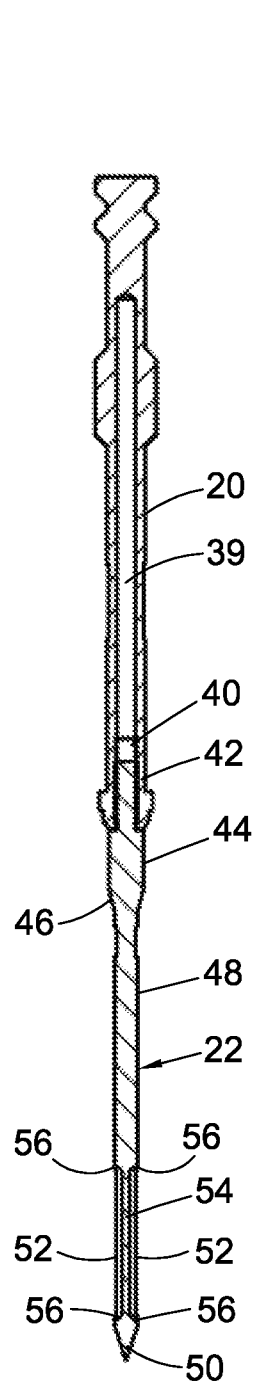
FIG. 2 shows a section view of the sampling probe of FIG. 1.

As shown in FIG. 2, the upper stem section 20 includes an internal channel 39 that includes an internal thread 40 at the base end. The lower stem section 22 includes a corresponding threaded portion 42 that engages with the threaded section 40 of the upper stem section 20 to connect the lower stem section 22 to the upper stem section 20. The upper end of the lower stem section 22 defines a larger diameter section 44 having a diameter consistent with the diameter of the upper stem section 20. The diameter of the lower stem section 22 reduces along its length at tapered section 46 to a reduced diameter lower end 48. At its distal end the lower stem section 22 includes a pointed tip 50 for providing a tapered leading edge to assist insertion through the aperture of the septum of a sample vessel.

The reduced diameter of the lower section 48 allows easy initial insertion of the probe 10 through a septum. The diameter of the lower section 48 is selected such that in use it slides through the opening of a septum relatively easily, with some sealing purchase between the edge of the aperture and the lower section 48. As the probe 10 is further inserted the tapered section 46 arrives at the septum. The expanding diameter of the tapered section 46 allows transition to the larger diameter section 44 which creates a positive seal with the septum as the probe 10 is further inserted. This enables the probe 10 to seal the sample vessel in a very simple manner without requirement for a more complex arrangement of additional seals on the sample vessel and/or the probe 10. The larger diameter section 44 can also be used to seal the probe 10 within a probe storage and within the oven through engagement of the larger diameter section 44 with an O-ring seal tor similar sealing arrangement.

The lower stem section 22 includes a pair of longitudinally aligned and diametrically opposed grooved sorbent channels 52. The sorbent channels 52 are longitudinally extending and are recessed radially inwardly into the body of the lower stem section 22. The sorbent channels 52 have equal lengths and have a first lower end that is spaced longitudinally inboard from the tapered, pointed tip 50. The upper end of each channel 52 is spaced longitudinally downwards from the tapered section 46. The sorbent channels 52 contain a sorbent material 54 suitable for conducting sorptive sampling. Preferably the sorbent material 54 is Polydimethylsiloxane (PDMS) however other materials as detailed in the claims could foreseeable be used. The dimensions of each channel 52, including length, depth and width, are selected to define the volume of sorbent material 54 contained.

The sorbent material 54 is preferably poured into the channels 52 in a liquid state, with the channels 52 being filled by a set volume with the sorbent material 54 that moulds to the form of the channels 52. The sorbent material 54 sets within the channels 52 with the outer surface of the sorbent material 54 being flush with the outer rim 56 of each channel 52. As such, the surface of the sorbent material 54 is flush with or slightly recessed within the surface of the stem 22. In this way the surface of the sorbent material 54 is protected from abrasion as the lower stem section 22 is inserted through the septum of a sample vessel and retracted there through. Alternatively the sorbent material could be applied cylindrically to the outer surface similar to prior art however with greater surface thickness and hence volume of material which greatly improves sampling performance.

As the lower stem section 22 is detachable from the stem 20, in the event that there is any degradation in the integrity of the sorbent material 54 over time, the lower stem section 22 may be replaced without the requirement for replacing the whole probe 10.

The upper stem section 20 contains a recess 30 for barcoding either by printing, engraving or other. Recessing the barcode minimises abrasion to the barcode during use.

Figures 3, 4:
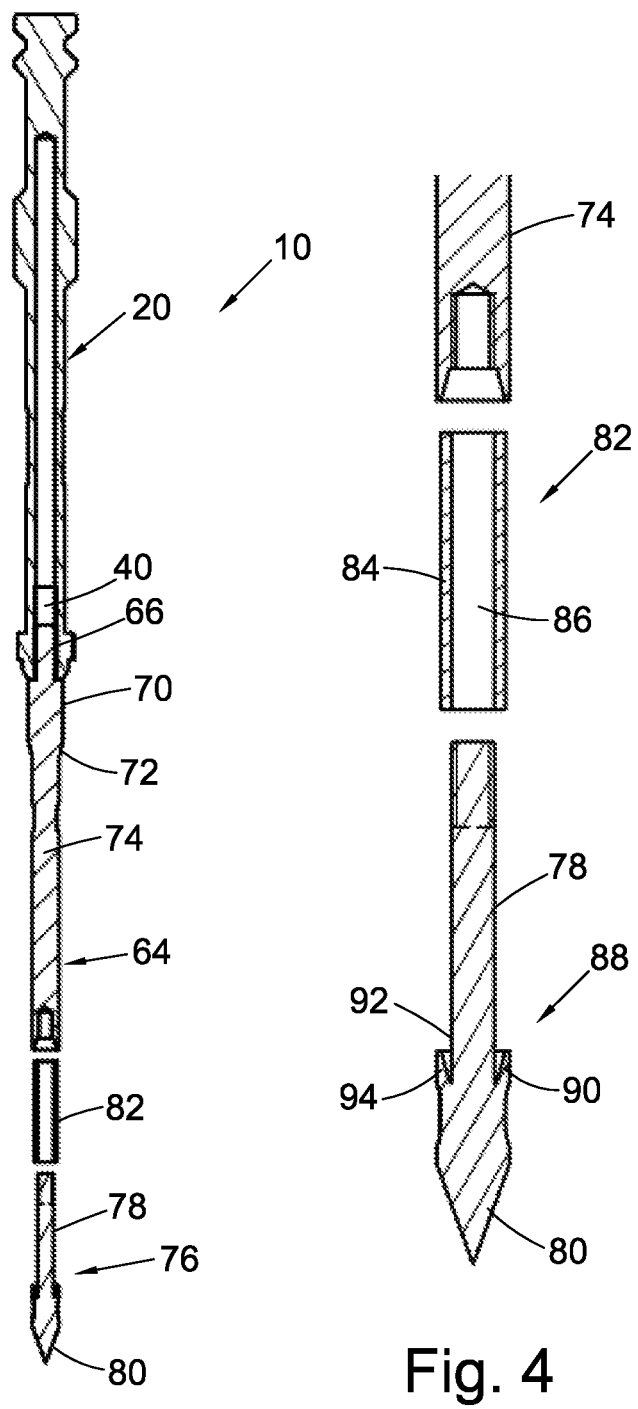
FIG. 3 shows a section view of a sampling probe according to another embodiment of the invention.
FIG. 4 is an enlarged view of the lower section of the probe of FIG. 3.

In an alternative embodiment shown in FIG. 3 the sample probe 60 comprises an upper stem section 20 and lower stem section 64. The configuration of the upper stem section 20 is the same as the upper stem section 20 described above. The lower stem section 64 includes a threaded portion 66 that engages with a corresponding threaded section 40 of the upper stem section 20 to connect the lower stem section 64 to the upper stem section 20. The upper end 70 of the lower stem section 64 has a diameter consistent with the diameter of the upper stem section 20. The diameter of the lower stem section 64 reduces along its length at tapered section 72 to a reduced diameter lower end 74.

The lower end 74 includes a detachable tip section 76. The tip section 76 includes a shaft 78 and a tapered tip 80 at its distal end. A sleeve 82 is provided that is formed of a sorbent material. As shown in FIG. 4, the sleeve 82 is substantially cylindrical having a wall section 84 with a bore 86 extending therethrough. The bore 86 has a diameter substantially equal to the diameter of the shaft section 76. The sleeve 82 is therefore configured to fit over and receive the shaft 78 in a closely tolleranced fit such there is substantially no gap between the inner surface of the bore 84 and the outer surface of the shaft 78.

The tip 80 is tapered to a point at its distal end for providing a tapered leading edge to assist insertion through the aperture of the septum of a sample vessel. At the inner end 88 the tip 80 includes an annular recess 90 extending longitudinally towards the distal end. The recess 90 has an inner wall 92 that is contiguous with the outer wall of the shaft 78, and an outer wall 94. At the opening of the recess 90 the outer wall 94 is spaced radially outwards from the inner wall 92. The outer wall 94 is angled radially inwards towards the base of the recess 90 such that the recess 90 tapers to its base where the outer wall 94 and inner wall 92 meet.

The invention claimed is:

1. A sample probe for sorptive sampling comprising:
an elongate shaft having a longitudinal axis defined along its length and a radial axis extending transverse to the longitudinal axis, the elongate shaft having an outer surface with a first diameter and a reduced diameter shaft section having a second diameter that is smaller than the first diameter, the reduced diameter shaft section being formed in the outer surface of the elongate shaft defining a recess along the length of the elongate shaft that extends radially into the outer surface of the elongate shaft, the recess being longitudinally located between first and second enlarged diameter sections located respectively at first and second ends of the recess, the enlarged diameter sections each have an inner end, the inner ends of the first and second enlarged diameter sections oppose each other and each inner end has an inner face, the inner faces face towards the reduced diameter shaft section in the longitudinal direction; and
a sleeve formed of a sorbent material;
wherein the sleeve is received within the recess about the reduced diameter shaft section between the inner faces, and
wherein each inner face includes a recess that extends longitudinally into the respective enlarged diameter section, the recesses each being arranged to receive an end of the sleeve such that when ends of the sleeve are received in the recesses the ends are radially and longitudinally constrained.

2. A sample probe according to claim 1 wherein the sleeve is received within the recess and the recess and the sleeve are configured such that the sleeve does not extend radially outwards of the recess.

3. A sample probe according to claim 1 wherein the enlarged diameter sections have an outer diameter that defines the first diameter.

4. A sample probe according to claim 3 wherein the sleeve has an outer diameter equal to or less than the diameter of the enlarged diameter sections.

5. A sample probe according to claim 1 wherein the recess of each enlarged diameter section includes radially inner and outer walls and the ends of the sleeve are located between the inner and outer walls of each recess.

6. A sample probe according to claim 5 wherein the sleeve is longitudinally clamped between the first and second enlarged diameter sections.

7. A sample probe according to claim 1 wherein the recesses of the enlarged diameter sections are annular and have an outer diameter and the diameter of the sleeve is substantially equal to the outer diameter of the recesses, the ends of the sleeve being received within the recesses around the entire circumference of the recesses.

8. A sample probe according to claim 7 wherein each recess has an opening and a base and each recess tapers radially inwards in the longitudinal direction away from its opening to its base to clamp and seal with the sleeve.

9. A sample probe according to claim 1 wherein at least one of the enlarged diameter end sections is releasably connected to the reduced diameter shaft section.

10. A sample probe according to claim 9 wherein one of the enlarged diameter end sections is secured to the reduced diameter shaft section by a threaded connection, said enlarged diameter end section including a threaded bore and the end of the reduced diameter shaft section including a corresponding threaded connector section.

11. A sample probe according to claim 10 wherein the length of the sleeve is selected such that when the enlarged diameter end section is threaded to the reduced diameter shaft section the sleeve is longitudinally clamped by the enlarged diameter end sections at either end of the reduced diameter shaft section.

12. A sample probe according to claim 1, wherein the sorbent material is a material from the group consisting of polyethylene glycol, silicone, octadecyltrichlorosilane, polymethylvinyl chlorosilane, liquid-crystalline polyacrylates, grafted self-organized monomolecular layers, graphene, carbon nanotubes, ionic liquids and inorganic coating materials.

* * * * *